United States Patent [19]  
Johnson

[11] 4,083,375  
[45] Apr. 11, 1978

[54] PILOT REGULATOR

[76] Inventor: Dwight N. Johnson, 24656 Shadowfax, El Toro, Calif. 92630

[21] Appl. No.: 659,146

[22] Filed: Feb. 18, 1976

[51] Int. Cl.² .......................................... F16K 31/365
[52] U.S. Cl. ..................................... 137/86; 137/489
[58] Field of Search ............... 137/489, 494, 495, 469, 137/475–478, 86, 85, 84; 251/209, 61.1

[56] References Cited

U.S. PATENT DOCUMENTS

| 459,268 | 9/1891 | Coale | 137/476 |
|---|---|---|---|
| 802,496 | 10/1905 | Collin | 137/489 X |
| 1,228,104 | 5/1917 | Fulton | 137/489 |
| 1,311,536 | 7/1919 | Smoot | 137/489 |
| 2,424,328 | 7/1947 | Pars | 251/209 |
| 2,672,882 | 3/1954 | Bergquist | 137/478 |
| 2,888,941 | 6/1959 | Grogar | 137/86 |
| 2,990,847 | 7/1961 | Absalom | 137/489 |
| 3,056,417 | 10/1962 | Greaves | 137/86 |
| 3,143,134 | 8/1964 | Karpis | 137/489 X |
| 3,276,467 | 10/1966 | Case | 137/489 |
| 3,373,765 | 3/1968 | McCarty | 137/489 |
| 3,586,025 | 6/1971 | Blaiklock | 137/86 X |
| 3,669,142 | 6/1972 | Gerbic | 137/489 |
| 3,823,726 | 7/1974 | Akigama | 137/86 |

OTHER PUBLICATIONS

Pamphlet – Singer, American Meter Division, "Instructions for the American Axial Flow Valve", May 1973.

Primary Examiner—Alan Cohan  
Attorney, Agent, or Firm—Mason, Kolehmainen, Rathburn & Wyss

[57] ABSTRACT

A pilot regulator for pressure regulation servo-control of a valve in a compressible fluid system includes a delay arrangement for achieving both rapid response and stable operation. The regulator includes a restrictor for supplying fluid from the main valve inlet to a control chamber, and a pilot valve for exhausting fluid from the control chamber. A diaphragm assembly for operating the pilot valve is biased in one direction by a reference force or pressure and in the opposite direction by the static pressure to be regulated. The control chamber and a delay chamber, in adjustable restricted communication with the control chamber, bias the diaphragm assembly in opposite directions. When static pressure change causes movement of the diaphragm assembly and opening or closing of the pilot valve, the difference in control pressure with respect to delay pressure permits limited abrupt movement of the diaphragm assembly, and provides a gradual continued reset movement.

3 Claims, 5 Drawing Figures

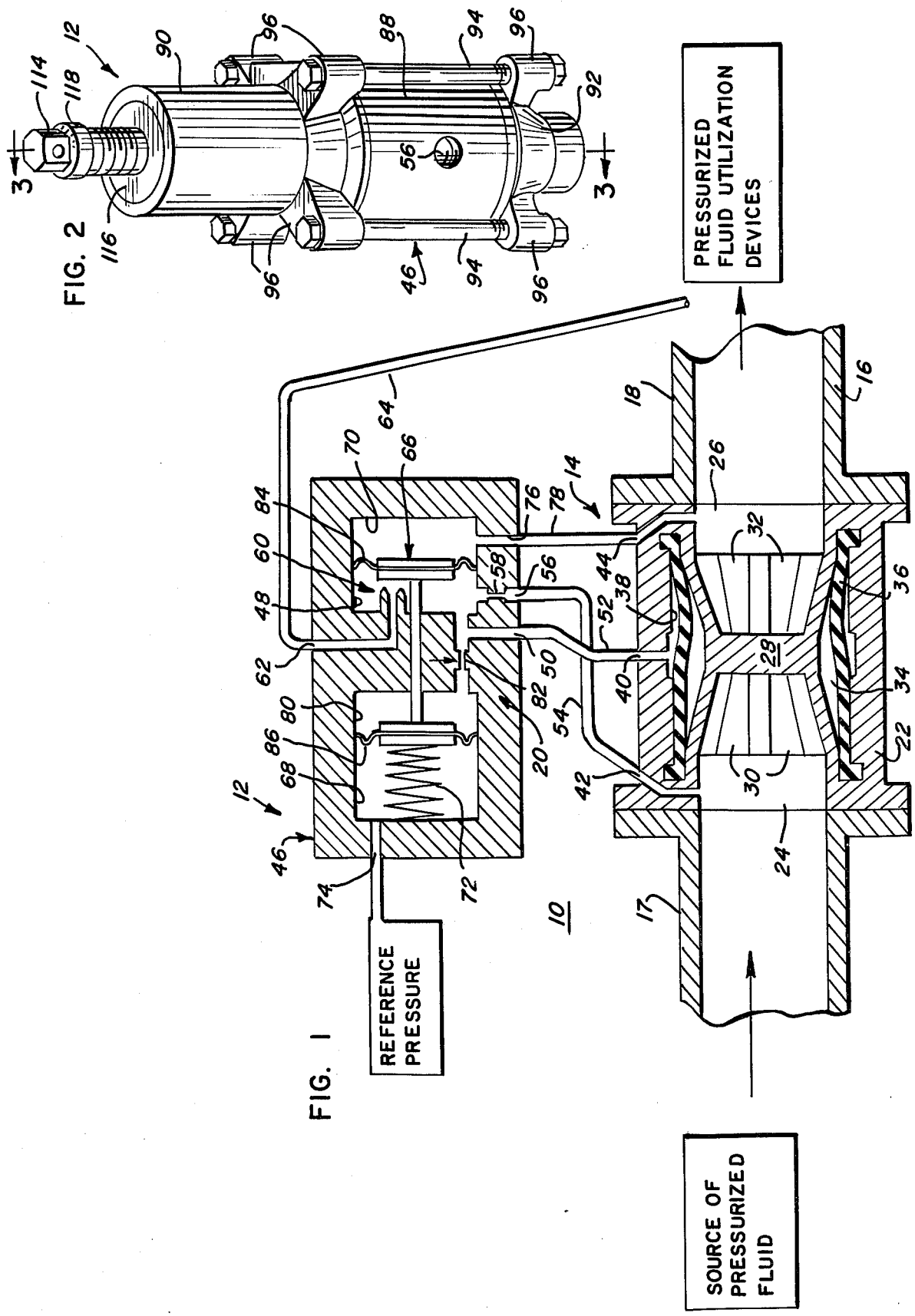

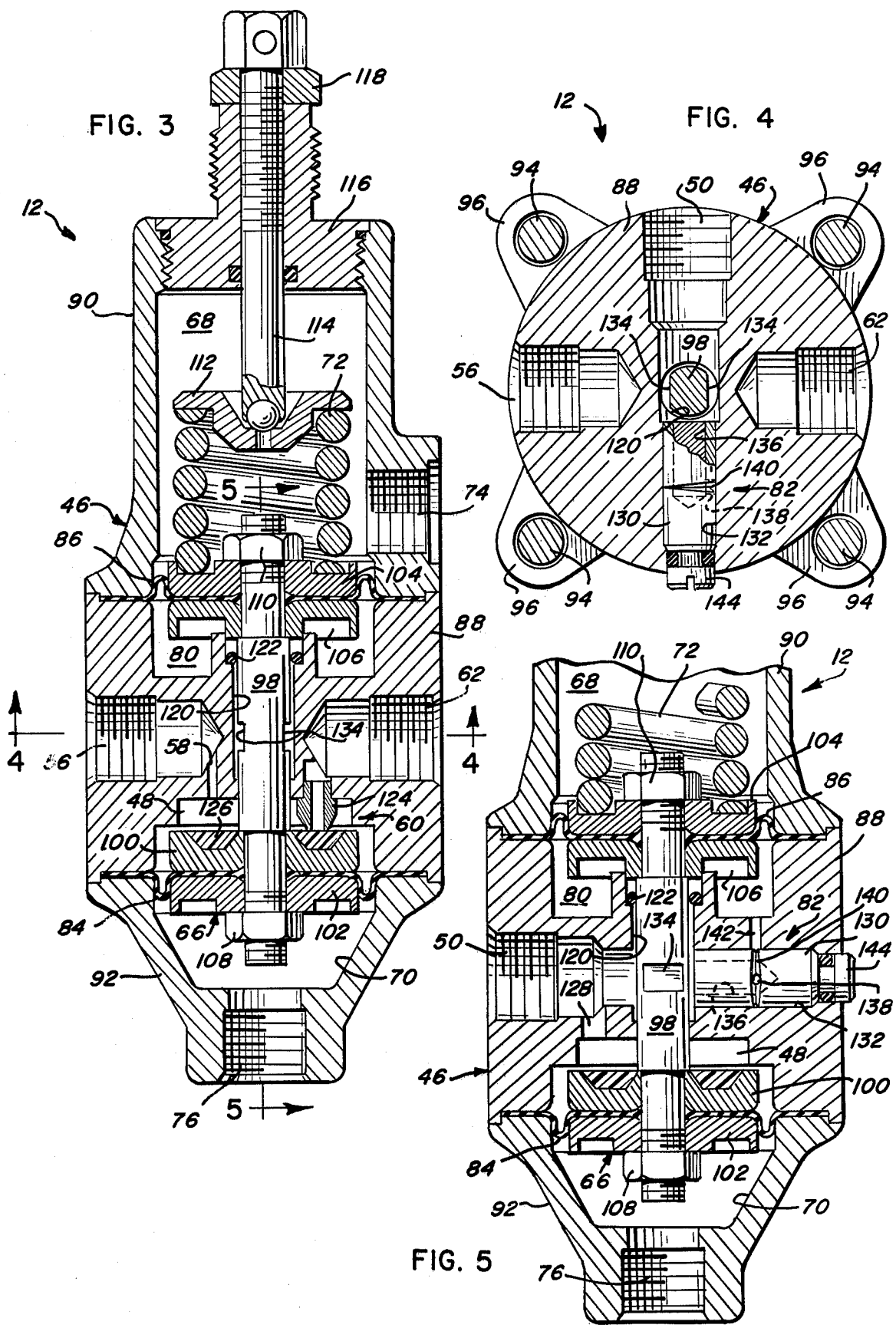

PILOT REGULATOR

The present invention relates to pilot regulators for the servo-control of valves of the type used in compressible fluid pipelines or conduits. More specifically, the invention relates to improvements in pilot regulators for achieving both rapid response and stable regulation.

A typical valve used in gas service for control of flow through a pipeline or conduit includes an inlet, an outlet, and a valve member movable in the flow path. Such a valve may be operated in an on-off fashion between opened and closed positions, and also may be used as a flow or pressure regulator in which case the valve member is normally positioned in intermediate or throttling positions.

One valve configuration having wide use in large pipelines, for example up to 12 inches, includes a resilient sleeve controlling axial flow around a central barrier in the flow path. A control pressure is applied in a pressure chamber surrounding the sleeve, and the valve is opened as the sleeve is expanded outwardly by reduction in control pressure relative to inlet pressure. Examples of valves of this type are disclosed in U.S. Pat. Nos. 3,371,677 - Connolly and 3,838,704 - Johnson.

For pressure regulation operation, the control pressure is typically derived from inlet pressure by a feedback pilot control system including a pilot regulator. The valve inlet is communicated to the pilot regulator through a flow restrictor, and the regulator includes a pilot valve for exhausting or bleeding pressure to atmosphere or to a region of low pressure in the pipeline or conduit. Control pressure for operating the main valve is obtained from a control chamber located between the restrictor and pilot valve, and is determined by the degree to which opening of the pilot valve causes a reduction in control pressure relative to inlet pressure.

In known pilot regulators, the pilot valve is operated by a piston means biased in one direction by a reference pressure or force provided by a spring load and/or by a source of reference pressure. The piston means is biased in the opposite direction by a static pressure or feedback signal obtained from the region in the fluid system where pressure regulation is to be effected. The term "piston means" as used herein is intended to encompass pressure-operated, movable structures such as pistons, valve spools, diaphragms and the like. Thus, there is provided a servo-loop or control loop in which changes in the static pressure to be regulated result in opening or closing of the pilot valve and in consequent changes in the control pressure and the main valve position. A more detailed description of such known pilot regulators and control systems may be found in a publication of the American Meter Division of The Singer Company entitled "Instructions for the American Axial Flow Valve" issued May, 1973 as publication No. AIM-145A(BP-3864-7.5M-7-73).

Achieving stability in operation has been a serious problem in servo-control systems using pilot regulators of known construction. In order to provide sensitivity in the system so that undesirable delay in operation of the main valve and resultant delay in static pressure corrections are avoided, it is desirable that pilot valve operation (and control pressure adjustment) be relatively rapid and substantial. However, when known regulators are designed and adjusted to achieve the desired fast response, stable operation is difficult to achieve, and undesirably large main valve adjustments result from even small variations in static pressure.

It is an important object of the present invention to provide a pilot regulator for gas service wherein improved stability in operation is achieved. It is another object of the invention to provide a pilot regulator characterized by both stability in operation and by the ability to produce rapid main valve adjustments in response to static pressure variations. Another important object of the present invention is to provide a pilot regulator wherein initial pilot valve movement in response to static pressure change is abrupt and wherein continued movement of the pilot valve to effect complete reset of the main valve is gradual.

Further important objects of the present invention are to provide a pilot valve embodying important structural and cost saving features including simplicity of design, incorporation of an integral flow restrictor, lack of necessity for an adjustable flow restrictor between the main valve inlet and the pilot valve, and the capability for ready adjustment of the delay encountered in gradual reset movement of the pilot valve.

In brief, the above and other objects and advantages of the present invention are achieved by providing an improved pilot regulator including a housing in which a pressure operated piston means or diaphragm assembly is mounted for reciprocal movement to control the opening and closing of a pilot valve. The regulator is adapted to be interconnected for servo-control of a main valve, and the main valve inlet is communicated with a control chamber through a fixed inlet restrictor defined in the pilot regulator housing. Exhausting of the control chamber through the pilot valve is controlled by movement of the diaphragm assembly to develop a control signal for operation of the main valve.

The diaphragm assembly is subjected to a reference force by means of a spring, reference pressure, or the like. An opposing force is applied to the diaphragm assembly by means of static pressure communicated from the region in the fluid system to be pressure regulated by the main valve. Fluctuations in static pressure result in movements of the diaphragm assembly causing opening or closing of the pilot valve and consequent changes in control pressure and in main valve positioning.

In accordance with an important feature of the present invention, there is provided a delay arrangement for achieving both rapid response and stable operation of the pilot regulator and of the valve controlled thereby. A delay chamber is defined in the pilot regulator housing, and the delay chamber is in restricted, adjustable pressure communication with the control chamber. The pressures within the delay and control chambers are applied to the diaphragm assembly in opposing directions. When a change in static pressure is experienced, the diaphragm assembly moves rapidly through a portion of the movement required to return static pressure to the desired level. A pressure imbalance between the delay chamber and the control chamber prevents continued rapid movement. As pressure between the delay chamber and the control chamber is equalized by flow through the adjustable restriction, the diaphragm assembly moves gradually through the remainder of the movement required to achieve full reset.

The present invention together with the above and other objects and advantages will best appear from the following detailed description of an illustrative embodiment of the invention shown in the accompanying drawings, wherein:

FIG. 1 is a diagrammatic and schematic illustration of a pressure regulation system incorporating a pilot regulator constructed in accordance with the present invention;

FIG. 2 is a perspective view of a pilot regulator constructed in accordance with the present invention;

FIG. 3 is a cross sectional view of the pilot regulator of FIG. 2 taken along the line 3—3 of FIG. 2;

FIG. 4 is a cross sectional view of the pilot regulator of FIG. 2 taken along the line 4—4 of FIG. 3; and FIG. 5 is a cross sectional view of the pilot regulator of FIG. 2 taken along the line 5—5 of FIG. 3.

Having reference now to the drawings, and initially to FIG. 1, there is illustrated in simplified diagrammatic and schematic form a servo-control system designated as a whole by the reference numeral 10 including a pilot regulator generally designated as 12 and embodying principles of the present invention. The system 10 includes a valve generally designated as 14 for controlling the flow of a compressible fluid or gas through a conduit or pipeline 16 including an upstream or inlet pipe 17 connected to a source of pressurized fluid and a downstream or outlet pipe 18 supplying fluid to one or more pressurized fluid utilization devices. The pressure regulator 12 is interconnected with valve 14 for operating the valve 14 to provide pressure regulation of fluid flowing in the conduit or pipeline 16. In accordance with the invention, regulator 12 is provided with a delay arrangement generally designated by the reference numeral 20 for achieving rapid response and stable operation.

The valve 14 may be of any desired construction because the pilot regulator 12 of the present invention is capable of controlling valves of many types wherein control is achieved by means of amplitude variations in a pressure control signal. In the illustrated arrangement valve 14 includes a housing structure 22 mounted between fittings of the pipes 17 and 18 and having a valve inlet 24 and a valve outlet 26. A central barrier 28 is disposed between a number of inlet flow slots 30 and outlet flow slots 32. An axial flow path 34 including the slots 30 and 32 surrounds the central barrier 28.

Flow through the valve 14 in the illustrated arrangement is controlled by the positioning of a flexible, resilient valve member or sleeve 36. Positioning of the sleeve 36 between open, closed and intermediate throttling positions is accomplished by the application of control pressure to a pressure chamber 38 within the housing structure 22 surrounding the sleeve 36. Control pressure is communicated to pressure chamber 38 by means of a control port 40 formed in housing structure 22. Housing structure 22 also includes additional ports 42 and 44 communicating respectively with the main valve inlet 24 and the main valve outlet 26. Reference may be had to the above referenced U.S. Pat. Nos. 3,371,677 and 3,838,704 for detailed descriptions of valves of the general type illustrated in the drawings of the present application.

In the illustrated arrangement, the pilot regulator 12 operates the valve 14 to provide downstream pressure regulation of the fluid flowing in the conduit 16, — i.e., the valve 14 is operated to produce constant fluid pressure at the valve outlet 26. The present invention is not limited to this specific type of pressure regulation and the pilot regulator 12 can readily be adapted to provide other types of regulation.

In general, the pilot regulator 12 includes a housing structure 46 defining a control chamber 48 communicating with the pressure chamber 38 of valve 14 by way of a pilot regulator control port 50 and a conduit 52. Control pressure is derived from main valve inlet pressure, and control chamber 48 is connected to main valve inlet 24 by means of a conduit 54, an inlet port 56 in the pilot regulator housing structure 46, and a flow restrictor 58 of fixed cross sectional area. Pressure is selectively bled or exhausted from control chamber 48 by means of a pilot valve 60 through an exhaust port 62. The exhaust port 62 may exhaust fluid directly to atmosphere, or as in the illustrated arrangement through an exhaust conduit 64 connected downstream in the pipeline 16.

If the pilot valve 60 is closed, the control pressure established within the control chamber 48 is equal to pressure existing at the inlet 24 of the valve 14. Under these circumstances, the sleeve 36 is pressure biased into engagement with the central barrier 28 and the main valve 14 is closed. In FIG. 1, the pilot valve 60 and main valve 14 are illustrated in an intermediate throttling position wherein the pilot valve 60 is partially open. In this condition, fluid flows through a series flow circuit including the restrictor 58 and the pilot valve 60, and the control pressure existing in control chamber 48 is lower than main valve inlet pressure by an amount equal to the pressure drop across restrictor 58. This intermediate control pressure is communicated to the pressure chamber 38 and results in partial opening or throttling operation of the valve 14.

Opening and closing of the pilot valve 60 is controlled by a piston means in the form of a diaphragm assembly generally designated as 66 mounted for reciprocal movement within the pilot regulator housing structure 46. When the diaphragm assembly 66 moves to the right as illustrated in FIG. 1, the pilot valve 60 is opened and the control pressure existing within chamber 48 decreases. Conversely, when the diaphragm assembly 66 moves to the left as illustrated in FIG. 1, the pilot valve 60 closes and control pressure increases.

The diaphragm assembly 66 and the housing structure 46 define a reference chamber 68 and a static chamber 70 for biasing the diaphragm assembly 66 in opposite directions thereby to control the pilot valve 60 in accordance with static pressure changes. In the illustrated arrangement, the reference and static chambers 68 and 70 are disposed at opposite ends of the diaphragm assembly 66, but this specific configuration is not necessary in achieving many of the objects of the present invention.

Reference chamber 68 is provided with suitable means of any known character for applying to the diaphragm assembly 66 a reference force or pressure. In the illustrated arrangement, a reference spring 72 urges the diaphragm assembly 66 toward the right as illustrated in FIG. 1. In addition, the reference chamber 66 is communicated with a source of reference pressure through a reference port 74 formed in housing structure 46. Spring 72 may be augmented or replaced by atmospheric or other reference pressure.

A static pressure corresponding to the parameter to be controlled by the pilot regulator 12 is communicated to the static pressure chamber 70. In the illustrated arrangement, the servo-control system 10 serves to regulate downstream main valve pressure, and the static chamber 70 is therefore communicated with the valve outlet 26 by means of a static pressure port 76 and a conduit 78.

Application of reference pressure in chamber 68 and static pressure in chamber 70 in opposite directions to the diaphragm assembly 66 establishes a set point or null point of operation of the pilot valve 60 for the purpose of maintaining regulated pressure in the system 10 at a constant value. In a steady state condition as illustrated in FIG. 1, pilot valve 60 is operated to a partially opened condition so that control pressure established in chamber 48 operates main valve 14 to a throttling condition for producing a downstream pressure in pipeline 16 corresponding to the desired level established by reference pressure. Should downstream static pressure tend to decrease, static pressure within chamber 70 also decreases causing opening of the pilot valve 60 thereby to decrease control pressure and further open valve 14. Similarly, should downstream static pressure increase, pilot valve 60 is urged toward a more closed position resulting in an increase in control pressure and closing movement of main valve 14.

In accordance with an important feature of the present invention, the delay arrangement 20 is provided for permitting fast response of the pilot regulator 12 without the introduction of the instability in operation which has characterized pilot regulators known in the past. More specifically, the delay arrangement 20 includes a delay chamber 80 intercommunicated with the control chamber 48 by means of a flow restriction 82. In the illustrated arrangement, the flow restriction 82 is adjustable to the end that the duration or response time of the delay imposed by the delay arrangement 20 can be adjusted to suit operating requirements of the system 10.

The pressures existing within the control chamber 48 and the delay chamber 80 are applied in opposite directions to diaphragm assembly 66. In the illustrated arrangement, these forces are applied between a pair of spaced diaphragms 84 and 86. This particular configuration, however, is not necessary in accomplishing many of the objects of the present invention.

When the position of the pilot valve 60 is altered by movement of the diaphragm assembly 66, pressure within the control chamber 48 is capable of changing abruptly. However, due to the flow restriction 82, pressure within the delay chamber 80 changes only gradually. When downstream fluid utilization changes create a given change in static pressure, the diaphragm assembly 66 moves from an initial set point or null position to a final "reset" position required for opening or closing pilot valve 60 a predetermined amount thereby to establish a changed control pressure sufficient to operate valve 14 to return downstream pressure to the desired level.

Due to the provision of the delay chamber 80 and restriction 82, the diaphragm assembly 66 is capable of moving abruptly through a portion of this range of movement, and is prevented from continuing its full movement in an abrupt fashion. In this manner, undesirably large fluctuations or adjustments of the main valve 14 are avoided. Following the initial rapid movement of the diaphragm assembly 66, the delay arrangement 20 permits gradual further movement of the diaphragm assembly 66 until the full reset action to the new null or set point is completed.

In the operation of the system 10, assume that the source of pressurized fluid supplies gas at a pressure of 100 psi to the valve 14 and that it is desired to regulate downstream pressure at the outlet 26 at a level of 30 psi. Each of the pilot regulator pressure chambers 48, 68, 70 and 80 in the illustrated arrangement is of equal area, although this specific configuration is not required. In order to maintain a regulated pressure of 30 psi, reference chamber 68 is provided with a pressure or force equivalent to 30 psi. In an initial steady state condition, the static pressure in chamber 70 is also 30 psi.

Pilot valve 60 is partially open and inlet pressure is reduced by flow through restrictor 58 and pilot valve 60 to create a control pressure, assumed initially, for example, to be 90 psi. This control pressure is applied to valve sleeve 36 in pressure chamber 38 of valve 14, and valve 14 is in a partially open or throttling condition permitting flow sufficient to maintain downstream pressure at the desired static level of 30 psi.

An abrupt increase in flow demand by one or more downstream fluid utilization devices results in an abrupt, transient decrease in static pressure. Assuming a decrease of 5 psi in static pressure, the pressure in static pressure chamber 70 decreases from 30 to 25 psi. As a result, the diaphragm assembly 66 is subjected to a net pressure imbalance of 5 psi, and the diaphragm assembly 66 consequently moves rapidly to the right as illustrated in FIG. 1 to cause additional opening of pilot valve 60.

After an initial abrupt movement of the diaphragm assembly 66, the pilot valve 60 opens a predetermined amount to decrease the control pressure existing in chamber 48, thus decreasing the pressure in pressure chamber 38 and causing further opening of the valve 14. This initial drop in control pressure equals 5 psi, and the control pressure abruptly drops from 90 to 85 psi. Due to the provision of the restriction 82, the pressure in delay chamber 80 does not abruptly drop from 90 to 85 psi but rather remains effectively at 90 psi. Consequently, after the initial abrupt movement of diaphragm assembly 66, the assembly 66 is once again in a pressure balanced condition and rapid movement is limited to this initial portion of the total reset movement.

More specifically, in this pressure balanced condition, the reference pressure remains at an effective 30 psi while the static pressure is at 25 psi. The pressure within the delay chamber 80 is 90 psi, while the pressure within the control chamber 48 is 85 psi. The rapid partial opening of pilot valve 60 permits valve 14 to rapidly open to a sufficient extent to make up downstream flow demand so that the 25 psi static pressure is maintained. The pressure imbalance provided by the present invention between chambers 48 and 80 thus limits the rapid initial movement of diaphragm assembly 66 to the limited amount required to produce a control pressure change equal to the static pressure change.

After the initial rapid movement of the diaphragm assembly 66, pressure is gradually equalized by flow through restriction 82 between the delay chamber 80 and the control chamber 48. As this gradual pressure equalization takes place, the diaphragm assembly 66 gradually continues its movement, and gradually further opens pilot valve 60. During this gradual continued movement, the control pressure in chamber 48 further decreases, as does the pressure in pressure chamber 38. Consequently, valve 14 gradually further opens.

This gradual additional movement continues until reset action is complete at which time downstream static pressure reaches the desired level of 30 psi. At this time, the delay chamber pressure and the control pressure are equal and are at a value lower than 85 psi. In this new steady state condition the diaphragm assembly 66 is in a balanced condition with the static pressure and the reference pressure both effectively equal to 30 psi and with the delay chamber pressure the control chamber pressure equal to one another. The gradual completion of reset movement prevents unstable wide excursions of control pressure and of main valve positions to which known pilot regulators are subject.

As will readily be understood by those skilled in the art, the pressure regulator 12 can be adapted to other types of pressure regulation. In general, the static pressure chamber 70 is interconnected to receive a pressure corresponding to the parameter to be controlled, and the reference pressure is applied in opposition to the static pressure in the direction necessary to bring about the desired opening and closing operation of pilot valve 60. For example, a pressure relief or upstream pressure regulation function can be accomplished by reversing the directions in which reference pressure and static pressure act on the diaphragm assembly 66 with respect to the pilot valve 60. For differential pressure regulation, static or feedback pressures are applied to both chambers 68 and 70.

Referring now to FIGS. 2-5, there is illustrated in detail the structure of the pilot regulator 12 illustrated in FIG. 1 in generalized schematic form. The housing structure 46 includes a body member 88 clamped between a spring housing 90 and an end cover 92 by means of flange bolts 94 cooperating with ears or flanges 96 on the housing 90 and cover 92. Diaphragms 84 and 86 are sandwiched respectively between the body 88 and cover 92 and between the body 88 and the spring housing 90. Thus, there is provided an economical construction utilizing a minimum of parts and capable of being assembled and machined at low cost.

In addition to the two diaphragms 84 and 86, the diaphragm assembly 66 includes a tie rod 98 carrying two clamping plates 100 and 102 clamped against opposite sides of diaphragm 84 and two clamping plates 104 and 106 clamped against opposite sides of diaphragm 86. The diaphragm assembly 66 is held in assembled relation by means of a pair of nuts 108 and 110 threaded on the ends of tie rod 98.

Reference spring 72 is held in compression between plate 104 and a spring pressure member 112. Adjustment of reference spring loading is accomplished by means of an adjustment shaft 114 threadably received in a cap 116 carried at the end of spring housing 90. A lock nut 118 serves to retain the shaft 114 in its adjusted position. Reference port 74 is formed in spring housing 90 for communicating atmospheric or other reference pressure to the reference chamber 68.

Static pressure is applied in static chamber 70 in opposition to the reference pressure or force applied in the reference chamber 68. In the illustrated arrangement, the static chamber 70 is defined within end cover 92 adjacent diaphragm 84, and communicates with static pressure port 76.

As best illustrated in FIG. 4, the control port 50, inlet port 56 and exhaust port 62 are formed in body member 88 and extend outwardly in a radial direction with respect to the central longitudinal axis of the body member. The body member is also provided with a central, axial opening 120 for reciprocation of the diaphragm assembly tie rod 98 therethrough. Control chamber 48 is defined in one end of body 88 adjacent diaphram 84, and delay chamber 80 is defined in the opposite end of body 88 adjacent diaphragm 86. An O-ring seal 122 prevents pressure communication around the tie rod 98 through the opening 120 between the control and delay chambers 48 and 80.

The inlet port 56 communicates with the control chamber 48 by means of the flow restrictor 58. With reference to FIG. 3 of the drawings, the restrictor 58 comprises a simple drilled hole in body member 88. This construction is possible since adjustment of restrictor 58 is not necessary with the pilot regulator 12 of the present invention due to the fact that the delay arrangement 20 provides ample stability and response. Consequently, in contrast to pilot regulation arrangements known in the past, restrictor 58 may be formed integrally with the housing structure 46 rather than comprising a separate component of the control system.

Pilot valve 60 comprises a fixed valve seat or orifice member 124 carried by the body 88 and communicating the control chamber 48 with the exhaust port 62. A resilient annular insert 126 in the clamping plate 100 comprises a movable valve member cooperating with the valve seat 124. This is an extremely simple pilot valve structure, in contrast to known pilot regulators requiring complex movable structures for producing pilot valve operation.

As best seen in FIG. 5, the control port 50 communicates with the control chamber 48 by means of an unrestricted passage 128 formed in body 88. In this manner, control pressure is communicated from the control chamber 48 for the control of an external main valve in accordance with position of the diaphragm assembly 66.

In accordance with a feature of the present invention, the delay chamber 80 is in restricted adjustable communication with the control chamber 48. In the illustrated embodiment of the invention, the adjustable restriction is provided by means of a rotor member 130 rotatably carried in an opening 132 formed in body 88 as an extension of the control port 50. Rotor 130 communicates with control chamber 48 by means of the unrestricted passage 128, the inner portion of control port 50, and a reduced cross sectional area portion 134 of tie rod 98.

Rotor 130 is provided with a central cavity 136 preferably containing a filter cartridge for preventing fouling of the adjustable restriction 82. A radial opening 138 intercommunicates the central opening 136 with a variable width groove 140 circumscribing the outer periphery of rotor 130. A passage 142 aligned with the groove 140 extends to the delay chamber 80. The variable restriction 82 comprises the interface between groove 140 and passage 142, and the restriction is readily adjusted by rotation of the rotor 130 as by engagement of a head portion 144 of the rotor with a screwdriver or other tool. The restriction size may be adjusted from a maximum to a minimum, and preferably the groove configuration is such that the restriction can never be entirely closed.

The pilot regulator 12 of the present invention is adapted for liquid as well as gas service. In liquid service, because the fluid medium is not compressible, the operation of the pilot regulator differs. More specifically, the delay arrangement 20 in liquid service functions simply as a dashpot providing hydraulic damping of the movements of diaphragm assembly 66. Because a liquid in delay chamber 80 is not compressible, a rapid, partial, initial response of diaphragm 66 is not permitted. If no damping is desired in liquid service, or if no delay is desired in gas service, the restriction 82 can be omitted simply by removing rotor 130, enlarging passage 142 if necessary, and closing the outer end of opening 132.

While the invention has been described with reference to details of the illustrated embodiment, it should be understood that such details are not intended to limit the scope of the invention as defined in the following claims.

What is claimed and desired to be secured by Letters Patent of the United States is:

1. A pilot regulator for servo-control of a control pressure signal operated main valve in a fluid system, said pilot regulator comprising a housing including first and second end members and a body member sandwiched between said end members, a partition within said housing defining first and second chambers between said partition and said first and second end members, respectively, a pair of diaphragms each clamped between said partition and one said end member, means interconnecting said diaphragms for simultaneous movement, means defined between each said diaphragm and said end members for applying opposed forces to the outwardly facing sides of said diaphragms, delay and control chambers defined in opposite ends of said body member between each of said diaphragms and said partition and exposed to the inwardly facing sides of said diaphragms, passage means within said body and in said partition providing restricted flow between said delay and control chambers, and a pilot valve in said housing operable in response to diaphragm movement for intercommunicating said control chamber and the exterior of said housing, said pilot valve comprising a valve seat defined in said partition, and a valve element defined on the inwardly facing side of said diaphragm defining said control chamber.

2. A pilot regulator as defined in claim 1, said passage means comprising an adjustable restriction element removably mounted in said body member.

3. A pilot regulator as defined in claim 2, said element comprising a rotatable cylindrical plug member having a peripheral groove of varying width, and said passage means further including a passageway aligned with said groove.

* * * * *